(12) United States Patent
Barnes

(10) Patent No.: US 11,796,091 B2
(45) Date of Patent: Oct. 24, 2023

(54) PIPE LINER AND ASSOCIATED METHODS

(71) Applicant: FLOWLINING LIMITED, Edinburgh (GB)

(72) Inventor: Stephen Barnes, Edinburgh (GB)

(73) Assignee: Flowlining Limited, Edinburgh (GB)

( * ) Notice: Subject to any disclaimer, the term of this patent is extended or adjusted under 35 U.S.C. 154(b) by 12 days.

(21) Appl. No.: 17/642,430

(22) PCT Filed: Oct. 26, 2020

(86) PCT No.: PCT/GB2020/052710
§ 371 (c)(1),
(2) Date: Mar. 11, 2022

(87) PCT Pub. No.: WO2021/084236
PCT Pub. Date: May 6, 2021

(65) Prior Publication Data
US 2022/0341514 A1    Oct. 27, 2022

(30) Foreign Application Priority Data
Oct. 30, 2019  (GB) ...................................... 1915755

(51) Int. Cl.
*F16L 9/147* (2006.01)
*B29C 63/42* (2006.01)
(Continued)

(52) U.S. Cl.
CPC ............... *F16L 9/147* (2013.01); *B29C 63/42* (2013.01); *B29C 63/46* (2013.01);
(Continued)

(58) Field of Classification Search
CPC .. F16L 11/083; B32B 3/266; B32B 2307/724; B32B 2307/726
(Continued)

(56) References Cited

U.S. PATENT DOCUMENTS 4,436,778 A * 3/1984 Dugal ................. B29C 48/3363
264/515
2003/0213596 A1   11/2003 Davis
(Continued)

FOREIGN PATENT DOCUMENTS

CN     205877445 U    1/2017
DE     19801798 A1    6/1999
(Continued)

OTHER PUBLICATIONS

International Search Report dated Jan. 29, 2021 for PCT/GB2020/052710.
(Continued)

*Primary Examiner* — Patrick F Brinson
(74) *Attorney, Agent, or Firm* — FisherBroyles, LLP

(57) ABSTRACT

An improved pipe liner and associated methods, including a method of manufacturing the improved pipe liner and a method of lining a host pipe with such a pipe liner. The invention solves the problem of gas permeation through a polymer liner in hydrocarbon service which can result in corrosion of the host pipe and can also cause liner collapse. Corrosion occurs due to contact between corrosive species and the host pipe itself. Gases (307) can also accumulate in an annulus between or within the liner (305) and the host pipe (303) and expand during operational de-pressurisation of the pipeline, causing collapse of the liner. The improved pipe liner comprises a barrier layer (311), which prevents permeation through the liner, surrounding an inner polymer pipe (305A) and optionally covered by an outer polymer pipe (305B). The inner polymer pipe is porous which permits free movement of gas between the internal bore (302) of a lined pipe and the barrier layer, so as to prevent accumulation of gases anywhere in the lined pipe, while ensuring that gases do not permeate to, and damage, the host pipe. The liner can be inserted using Swagelining, roll-down, or any other suitable close-fit lining techniques, without compromising the effectiveness of the barrier layer.

28 Claims, 8 Drawing Sheets

(51) Int. Cl.
  *B29C 63/46* (2006.01)
  *B29K 105/00* (2006.01)
  *B29K 105/04* (2006.01)
  *B29L 23/00* (2006.01)
(52) U.S. Cl.
  CPC .. *B29K 2105/0097* (2013.01); *B29K 2105/04* (2013.01); *B29K 2995/0065* (2013.01); *B29L 2023/22* (2013.01)
(58) Field of Classification Search
  USPC .............. 138/123–126, 129, 137, 140, 141
  See application file for complete search history.

(56) References Cited

U.S. PATENT DOCUMENTS

| | | | |
|---|---|---|---|
| 2008/0236695 A1* | 10/2008 | Takagi | F16L 11/12 138/137 |
| 2011/0000572 A1* | 1/2011 | Ramaswamy | B32B 1/08 138/109 |
| 2011/0226375 A1* | 9/2011 | Harris | B32B 25/08 138/137 |
| 2016/0001520 A1* | 1/2016 | Waterworth | B32B 1/08 428/36.7 |
| 2016/0010785 A1 | 1/2016 | Arnold et al. | |
| 2017/0254446 A1 | 9/2017 | Glejbøl | |
| 2018/0119850 A1 | 5/2018 | Barnes | |

FOREIGN PATENT DOCUMENTS

| | | |
|---|---|---|
| EP | 0912853 A1 | 5/1995 |
| FR | 2982795 A1 | 5/2013 |
| GB | 2336885 A | 3/1999 |

OTHER PUBLICATIONS

Written Opinion dated Jan. 29, 2021 for PCT/GB2020/052710.
GB Combined Search and Examination Report for GB1915755.1 dated Feb. 13, 2020.
GB Examination Report for GB1915755.1 dated Dec. 10, 2021.

* cited by examiner

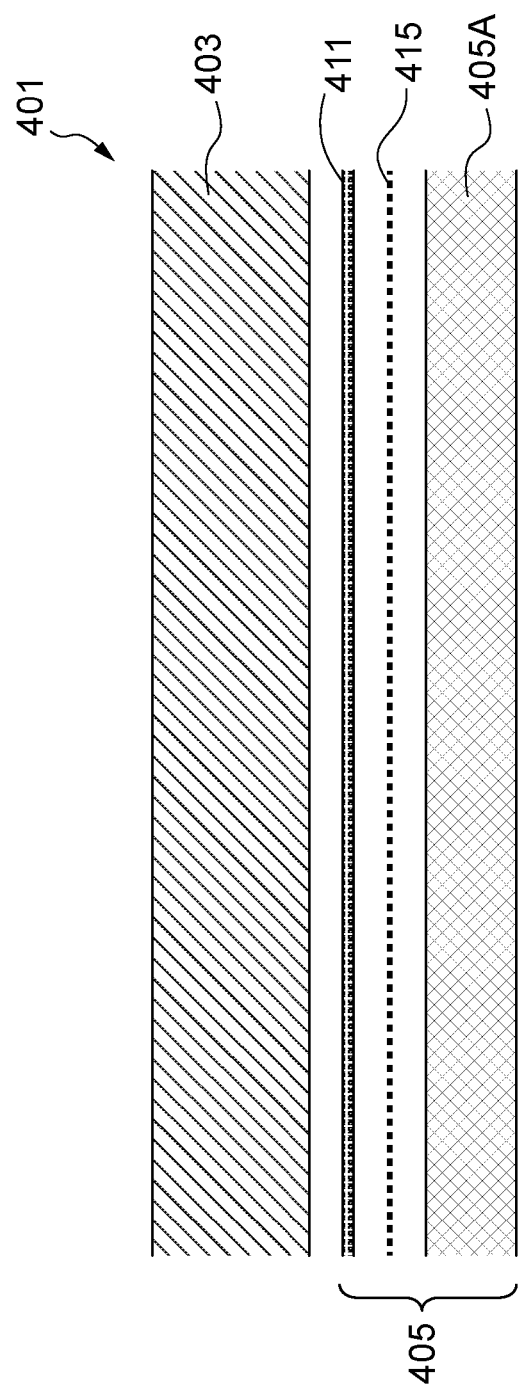

PIPE LINER AND ASSOCIATED METHODS

This application is the U.S. National Stage of International Application No. PCT/GB2020/052710, which was filed on Oct. 26, 2020. This application also claims the benefit of the filing date of GB patent application No. GB1915755.1 which was filed on Oct. 30, 2019. The contents of both of these applications are hereby incorporated by reference.

Improved Pipe Liner and Associated Methods

The present invention relates to the field of hydrocarbon service, and in particular pipelines comprising liners for corrosion prevention. More specifically, the present invention relates to improvements to such liners that increase the integrity and reliability of lined pipelines and reduce the risk of liner collapse without compromising corrosion prevention.

BACKGROUND TO THE INVENTION

British Patent Number GB 2,186,340, in the name of British Gas, discloses a method of lining a buried gas, water or sewage pipe using a synthetic resin liner having an external diameter greater than the internal diameter of the pipe. The liner is heated, pulled through a die which reduces its external diameter and then through the pipe to be lined. Thereafter the liner is pressurised such that it expands into contact with the internal wall of the pipe. U.S. Pat. No. 6,240,612, also in the name of British Gas, discloses a similar method of lining installed pipework in which the external diameter of a liner made from a memory retaining plastics material is reduced by up to 15% by pulling the liner through a die at ambient temperature. After pulling through the pipework the liner is allowed to expand within the pipework by relaxation of pulling tension followed by memory induced expansion at ambient temperature and pressure. This expansion into contact with the internal wall of the pipe is generally referred to as "reversion".

This pipe lining technique (and other similar techniques) has been used to extend and optimise the life and performance of new and existing pipelines, as an alternative to corrosion resistant alloys (CRA). Reversion, whether enforced (by temperature and/or pressure), by shape-memory effects (which may take several days) or otherwise, generally results in good conformity between the liner and the host pipe although surface irregularities may result in gases being trapped in the annular space between the liner and the host pipe.

Techniques exist to try and eliminate gases from the annulus to prevent the risk of liner collapse. For example, British Patent Number GB 2,536,492, in the name of Pioneer Lining Technology Limited, discloses a method in which progressive flooding of the pipeline acts to displace any air pockets in the annulus, in the direction of the flooding.

Depending on the respective materials chosen, a polymer lined carbon steel pipeline can be up to 50% cheaper to produce than a solid CRA pipeline or a pipeline clad or lined with CRA. However, despite this genuinely significant cost advantage, and acceptance of such lined pipelines for water injection service, the pipeline industry continues to specify CRA pipelines over polymer lined pipelines for hydrocarbon service, particularly in sour service.

There appear to be two principle concerns for this reluctance to specify polymer lined pipelines for hydrocarbon service. Firstly, corrosive species may be able to permeate through the polymer material and make contact with the host pipe. Secondly, permeated gas may accumulate in an annulus between or within the liner and the host pipe and expand during operational de-pressurisation of the pipeline, causing collapse of the liner.

In the pipeline industry, it is broadly accepted that under operating pressures, some gas from the transported product will permeate through a traditional polymer pipe liner, and as such a number of solutions exist which serve only to mitigate the risk of liner collapse (rather than try to prevent permeation).

U.S. Pat. No. 7,080,667, in the name of Boreas Consultants Limited, discloses a venting apparatus adapted for fitment in or through a pipe liner which allows gas to flow from the annulus (between the liner and the host pipe) to the internal bore of the liner, but not in the opposing direction. This arrangement prevents liner collapse by allowing venting through the wall of the pipe liner but does not remove gas from the annulus unless there is a suitable pressure differential.

Rather than vent gas back into the internal bore, U.S. Pat. No. 6,220,079 discloses a liner which is profiled to provide one or more continuous channels along an exterior surface of the liner, providing a path along the pipeline for any gases that may permeate through the liner. Permeated gases may be vented at the end of the pipeline.

Neither of these solutions address the fundamental problem that corrosive species may permeate through the liner and risk corrosive attack on the interior of the host pipe and/or initiate the risk of liner collapse.

It is therefore an object of at least one aspect of the present invention to address the problems posed by gas permeation through a pipe liner.

Further aims and objects of the invention will become apparent from reading the following description.

SUMMARY OF THE INVENTION

According to a first aspect of the invention there is provided a liner for lining a host pipe, the liner comprising:
an inner polymer pipe; and
a barrier layer surrounding the inner polymer pipe;
wherein the inner polymer pipe is porous.

Note that the liner could equivalently be termed a lining, pipe lining, or a pipe liner. Similarly, the inner polymer pipe is innermost and could equivalently be termed an innermost polymer pipe, a first polymer pipe, a first layer or an innermost layer, or variation thereof. For convenience, and consistency, the term "pipe" is preferred as the "pipe" might itself comprise multiple layers.

Preferably, the inner polymer pipe is extruded. Optionally, the inner polymer pipe comprises a porous material. Alternatively, or additionally, the inner polymer pipe comprises a sintered material.

Preferably, the inner polymer pipe comprises one or more materials selected from the group comprising PE, PE-RT, UHMWPE, PP, PVDF and PTFE. Optionally, the inner polymer pipe comprises a hydrophobic or hydrophilic material.

Optionally, the inner polymer pipe comprises two or more layers. Preferably, each of the layers is extruded. The two or more layers may be joined by a porous adhesive.

Preferably, the barrier layer comprises a metallic foil. The metallic foil may comprise one or more materials selected from the group comprising aluminium, stainless steel, Monel, Incoloy, Inconel or titanium.

Preferably, the barrier layer is attached to the inner polymer pipe. Preferably, the barrier layer is attached to the inner polymer pipe by an adhesive. Preferably, the adhesive is porous. Optionally, the adhesive is heat sensitive. Alternatively, the barrier layer is attached to the inner polymer pipe by an adhesive tape. The adhesive tape may be temperature and/or pressure sensitive.

Optionally, the barrier layer comprises a plurality of discrete circumferential sections. Alternatively, the barrier layer is wound around the inner polymer pipe. Preferably, successive turns of the barrier layer overlap. Preferably, the barrier layer is sealed.

Preferably, the liner further comprises an outer polymer pipe surrounding the barrier layer. Preferably, the outer polymer pipe is non-porous.

Likewise, the outer polymer pipe is outermost and could equivalently be termed an outermost polymer pipe, a second polymer pipe, a second layer or an outermost layer, or variation thereon. Again, for convenience, and consistency, the term "pipe" is preferred as the "pipe" might itself comprise multiple layers.

Preferably, the outer polymer pipe is extruded over the barrier layer. Optionally, the outer polymer pipe comprises one or more materials selected from the group comprising PE, PE-RT, UHMWPE, PP, PVDF and PTFE.

Optionally, the outer polymer pipe comprises a plurality of layers. Preferably, each of the layers is extruded. The plurality of layers may be joined by an adhesive.

Preferably, the external diameter of the liner is greater than the internal diameter of the host pipe. In particular, where present the external diameter of the second polymer pipe is greater than the internal diameter of the host pipe. Optionally, the external diameter of the inner polymer pipe is greater than the internal diameter of the host pipe. Where there is no outer polymer pipe, the external diameter of the inner polymer pipe may be greater than the internal diameter of the host pipe. Alternatively, the host pipe may be extruded over the barrier layer.

According to a second aspect of the invention, there is provided a method of manufacturing a liner, the method comprising:
  extruding an inner polymer pipe; and
  surrounding the inner polymer pipe with a barrier layer;
  wherein the inner polymer pipe is porous.

Optionally, the inner polymer pipe is extruded from one or more porous materials. Alternatively, the inner polymer pipe is extruded from one or more sintered materials.

Optionally, the inner polymer pipe comprises two or more layers, and the method comprises extruding the second and each subsequent layer over the preceding layer. For example, the inner polymer pipe may comprise three layers, in which case a first layer is extruded, a second layer extruded over the first, and a third layer extruded over the second.

Optionally, the method comprises determining a pore size, pore density and/or wall thickness of the inner polymer pipe in response to the service environment for which the liner is intended.

Optionally, the method comprises determining a thickness of the inner polymer pipe dependent on the properties of the material of the inner polymer pipe.

Preferably, surrounding the inner polymer pipe with a barrier layer comprises applying a metallic foil to the inner polymer pipe. Preferably, the method comprises allowing the inner polymer pipe to cool prior to applying the metallic foil.

Optionally, the method comprises selecting a material of the barrier layer in response to the service environment for which the liner is intended. Optionally, the method comprises selecting a thickness of the barrier layer in response to the properties of the material and/or the service environment for which the liner is intended.

Preferably, the method comprises applying an adhesive or an adhesive tape to the external surface of the inner polymer pipe prior to applying the barrier layer. Alternatively, the method comprises applying an adhesive or an adhesive tape to the internal surface of the barrier layer prior to applying the barrier layer.

Optionally, the barrier layer is applied to the inner polymer pipe in a continuous axial operation. Alternatively, the barrier layer is spirally wound around the inner polymer pipe. Preferably, successive turns of the barrier layer overlap.

Preferably, the method comprises sealing the barrier layer. Optionally, the barrier layer is sealed by heat sealing. Alternatively, the barrier layer is sealed by welding overlapping edges of the barrier layer, for example by gas thermal arc welding or by ultrasonic welding.

Preferably, the method further comprises extruding an outer polymer pipe over the barrier layer;

Preferably, the outer polymer pipe is extruded over the barrier layer using an annular die. Preferably, the method comprises applying a vacuum to draw the outer polymer pipe onto the barrier layer. Preferably, the method comprises allowing the outer polymer pipe to cool.

Optionally, the method comprises manufacturing the liner to a pre-set length to suit a host pipe for which the liner is intended. Optionally, the method is performed at a spoolbase, a bundle site or a double, quad or hex jointing facility. Optionally, the liner may be extruded directly on to a suitable reel or reels for onward shipment.

Embodiments of the second aspect of the invention may comprise features corresponding to the preferred or optional features of the first aspect of the invention or vice versa.

According to a third aspect of the invention, there is provided a method of lining a host pipe, the method comprising:
  providing a liner according to the first aspect;
  temporarily reducing the outer diameter of the liner such that it is less than the internal diameter of the host pipe;
  inserting the liner into the host pipe; and
  allowing the liner to revert towards its original size within the host pipe.

Preferably, the external diameter of the liner is greater than the internal diameter of the host pipe. In particular, the external diameter of the outer polymer pipe (where present) is greater than the internal diameter of the host pipe. Alternatively, the external diameter of the inner polymer pipe is greater than the internal diameter of the host pipe.

Preferably, the method comprises pulling the liner through a swaging die or one or more rollers. Alternatively, the method comprises folding or otherwise deforming the cross-section of the liner. Preferably, the method comprises subsequently pulling the liner through the host pipe. Preferably, the method subsequently comprises releasing pulling tension on the liner.

Embodiments of the third aspect of the invention may comprise features corresponding to the preferred or optional features of the first or second aspects of the invention or vice versa.

According to a fourth aspect of the invention, there is provided a lined pipe comprising:
  a host pipe; and
  a liner according to the first aspect located within the host pipe.

Optionally, the host pipe is lined with the liner in accordance with the third aspect.

Alternatively, the host pipe is extruded over the barrier layer.

Preferably, the host pipe is a carbon steel pipe. Alternatively, the host pipe may be a reinforced thermoplastic pipe or a flexible pipe or riser.

Embodiments of the fourth aspect of the invention may comprise features corresponding to the preferred or optional features of any of the first to third aspects of the invention or vice versa.

According to a fifth aspect of the invention, there is provided a composite pipe comprising:
a first polymer pipe;
a barrier layer surrounding the first polymer pipe; and
a second polymer pipe surrounding the barrier layer;
wherein the first polymer pipe is porous.

According to a sixth aspect of the invention, there is provided a method of manufacturing a composite pipe comprising:
extruding an inner polymer pipe;
surrounding the first inner polymer pipe with a barrier layer; and
extruding a second polymer pipe over the barrier layer;
wherein the first inner polymer pipe is porous.

Embodiments of the fifth and sixth aspects of the invention may comprise features corresponding to the preferred or optional features of any other aspect of the invention or vice versa, in particular the first and second aspects (respectively).

BRIEF DESCRIPTION OF THE DRAWINGS

There will now be described, by way of example only, embodiments of aspects of the invention with reference to the drawings (like reference numerals being used to denote like features), of which:

FIG. 8 is an exploded view of a partial cross-section of a flexible pipe lined with an alternative liner, in accordance with the invention.

Figure 1:
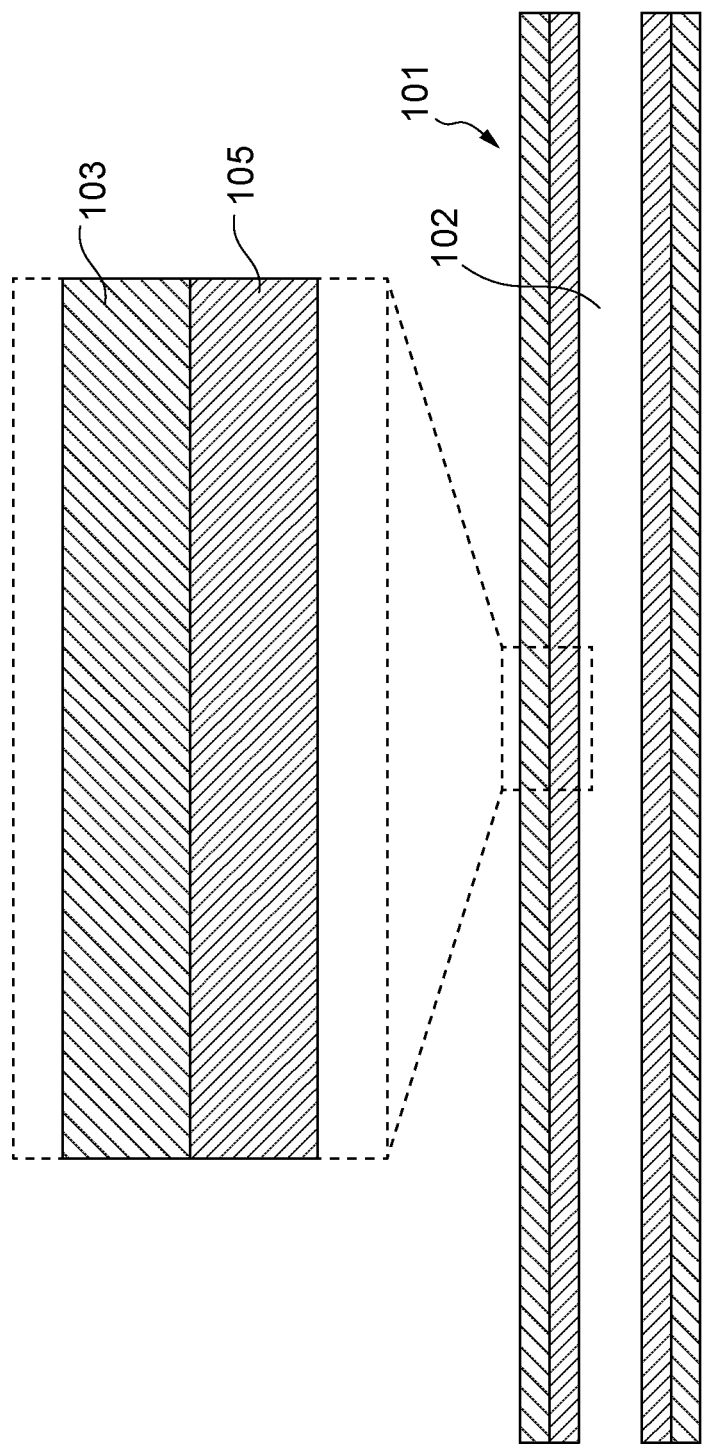
FIG. 1 illustrates a cross-section of a carbon steel host pipe lined with a polymer liner, according to the prior art, and (inset) an enlarged, partial cross-section thereof.

Unless stated otherwise, features in the drawings are not to scale. Scales are exaggerated in order to better illustrate the features of the invention and the problems which the invention are intended to address.

DETAILED DESCRIPTION OF PREFERRED EMBODIMENTS

Improved Pipe Liner

FIG. 1 shows a cross-section through a lined pipe 101 which comprises a carbon steel host pipe 103 and a polymer liner 105. As explained in the background to the invention above, the carbon steel host pipe 103 is provided with corrosion resistance by installation of a polymer liner (or pipe) 105 (using a reduction and reversion process) which remains in tight contact with the interior surface of the carbon steel host pipe 103. For the avoidance of doubt, the internal bore of the lined pipe through which fluid is transported is indicated by reference numeral 102.

Figure 2:
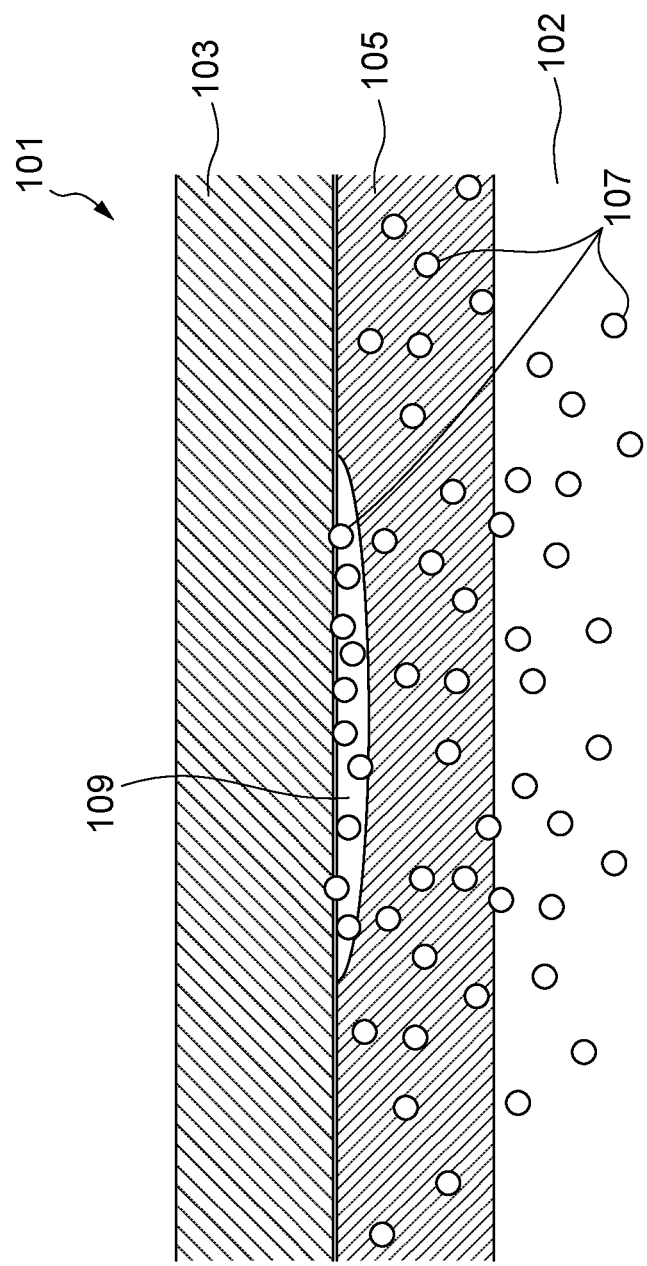
FIG. 2 illustrates a partial cross-section of the lined carbon steel host pipe shown in FIG. 1, in live hydrocarbon service.

In water injection service, the polymer liner 105 is not troubled by permeation of gas from the internal bore 102 into the annular space between the polymer liner 105 and the carbon steel host pipe, and FIG. 1 is illustrative of this scenario. However, in live hydrocarbon service as illustrated in FIG. 2, the lined pipe 101 is used to transport hydrocarbons at operating pressure. In this situation, gas (as indicated by reference numeral 107) permeates through the liner 105 from the internal bore 102 and accumulates in the annulus (as indicated by reference numeral 109). This creates back-pressure on the liner 105 which can cause the liner 105 to collapse when the operating pressure in the pipeline 101 is reduced.

Barrier pipe is used in the water industry, for example to transport drinking water in areas of contaminated ground, to prevent external contaminants (organic and inorganic) from penetrating through the material of the water pipe and thereby entering the water system. Barrier pipe typically comprises a protective aluminium layer (the barrier), sandwiched between an inner polymer pipe and an outer polymer pipe. The aluminium layer is bonded to each polymer pipe using an adhesive.

The Applicant made the surprising discovery that barrier pipe, or a liner comprising an internal barrier layer, can be installed as a liner in a carbon steel host pipe using a standard reduction, insertion and reversion process without compromising the integrity of the barrier layer.

Figure 3:
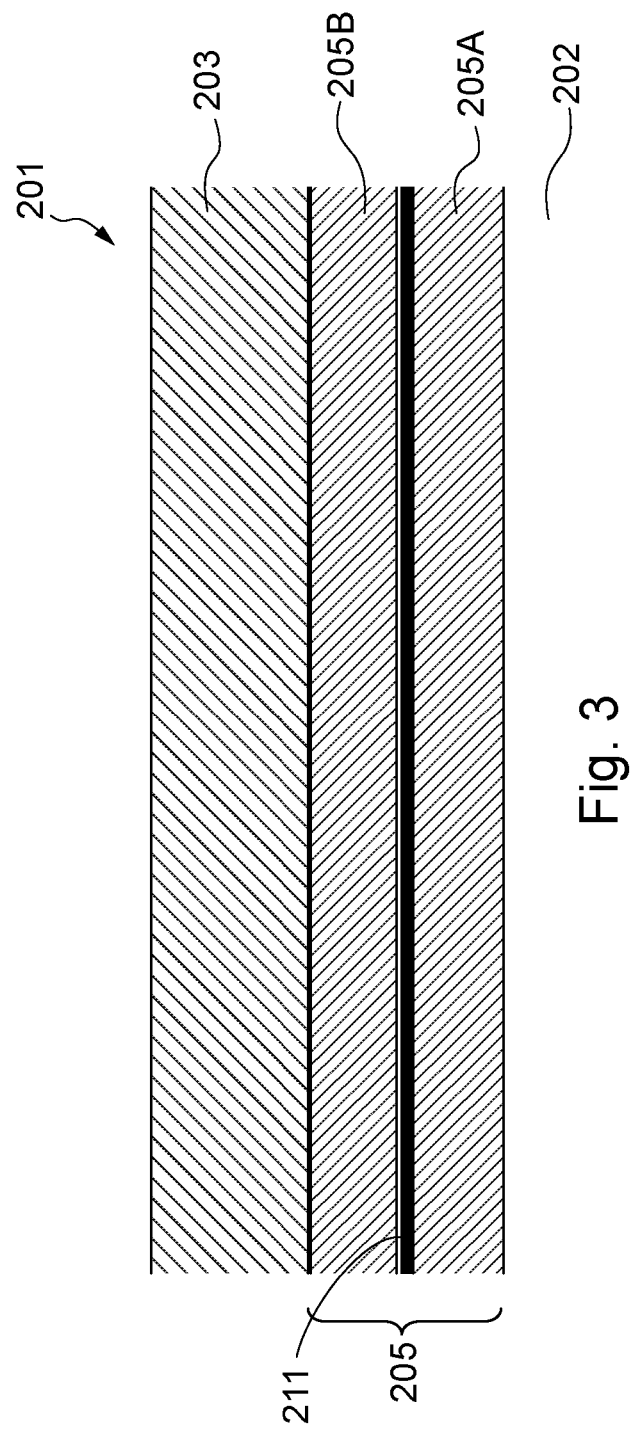
FIG. 3 illustrates a partial cross-section of a carbon steel host pipe lined with barrier pipe.

FIG. 3 shows a cross-section through a lined pipe 201 which comprises a carbon steel host pipe 203 lined with such a barrier pipe 205. The barrier pipe 205 comprises a central metallic layer (or barrier layer) 211 sandwiched between an inner polymer pipe 205A and an outer polymer pipe 205B. As with conventional barrier pipe, the barrier layer 211 is bonded to each polymer pipe 205A, 205B using an adhesive (not shown).

Independent testing confirms that even after reduction, insertion and reversion, the aluminium layer of barrier pipe (used as a liner) effectively prevents the migration of corrosive species through the liner. However, although testing demonstrated that barrier pipe can effectively protect carbon steel host pipes from corrosion, the Applicant has identified that the risk of liner collapse remains and is in fact increased.

Figure 4:
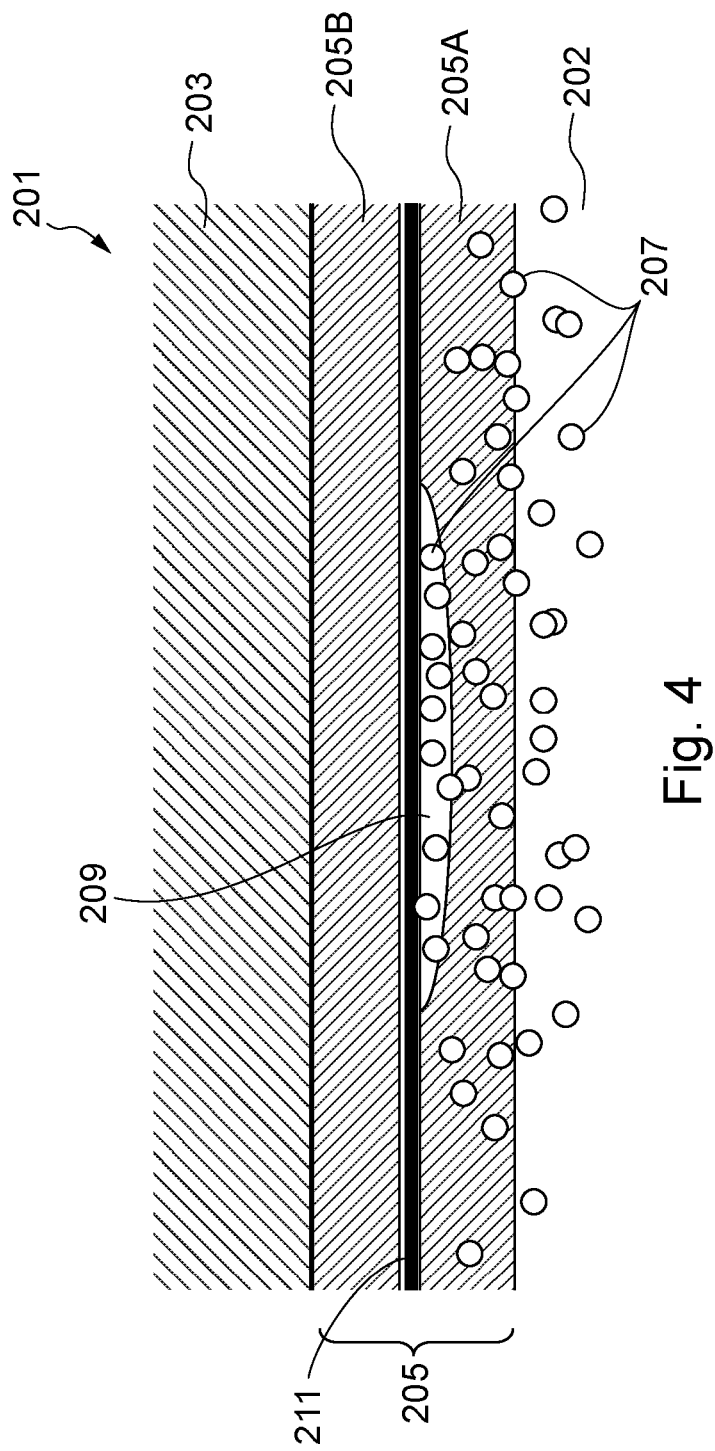
FIG. 4 illustrates a partial cross-section of the lined carbon steel host pipe shown in FIG. 3, in live hydrocarbon service.

FIG. 4 shows a cross section through the lined pipe 201 shown in FIG. 3, this time in live hydrocarbon service. Gas (as indicated by reference numeral 207) permeates from the internal bore 202 through the inner polymer pipe 205A and now accumulates between the inner polymer pipe 205A and the barrier layer 211 (as indicated by reference numeral 209). This presents the same, if not a greater, risk of collapse to the scenario illustrated in FIG. 2, as there is now a back-pressure on the inner polymer pipe 205A (which is thinner than the single layer liner 105). This back-pressure can cause the inner polymer pipe 205A to disbond from the barrier layer 211 and collapse when the operating pressure in the pipeline 201 is reduced.

Figure 5:
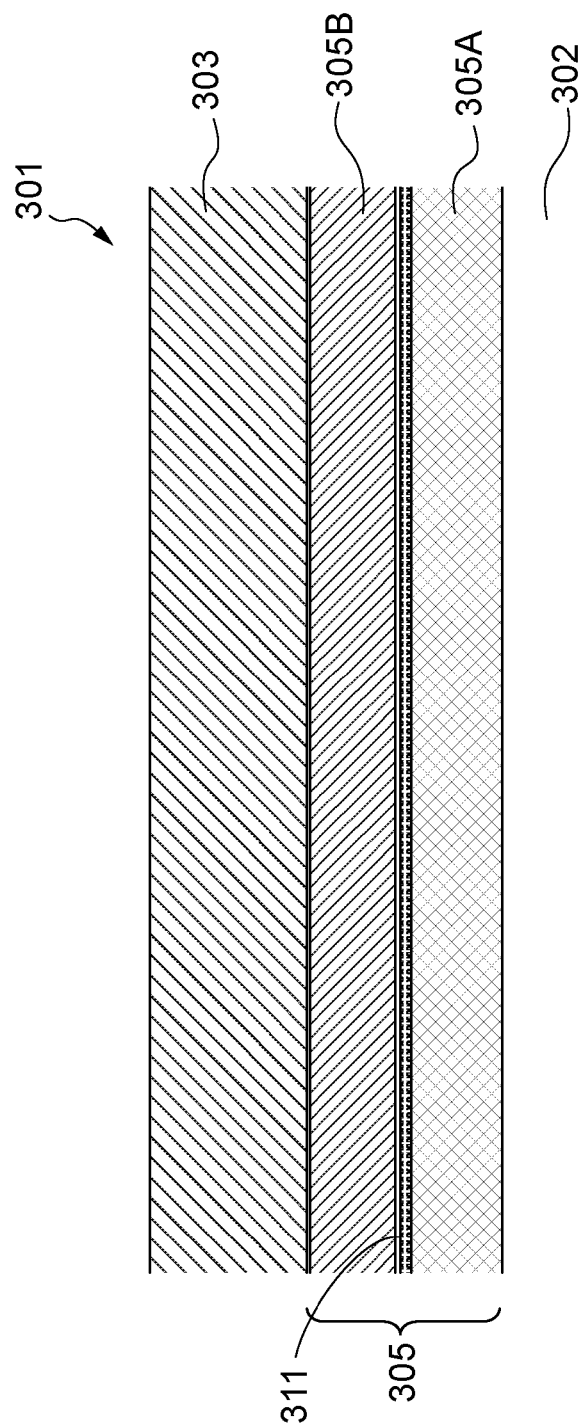
FIG. 5 illustrates a partial cross-section of a carbon steel host pipe lined with a liner, in accordance with the invention.
Figure 7:
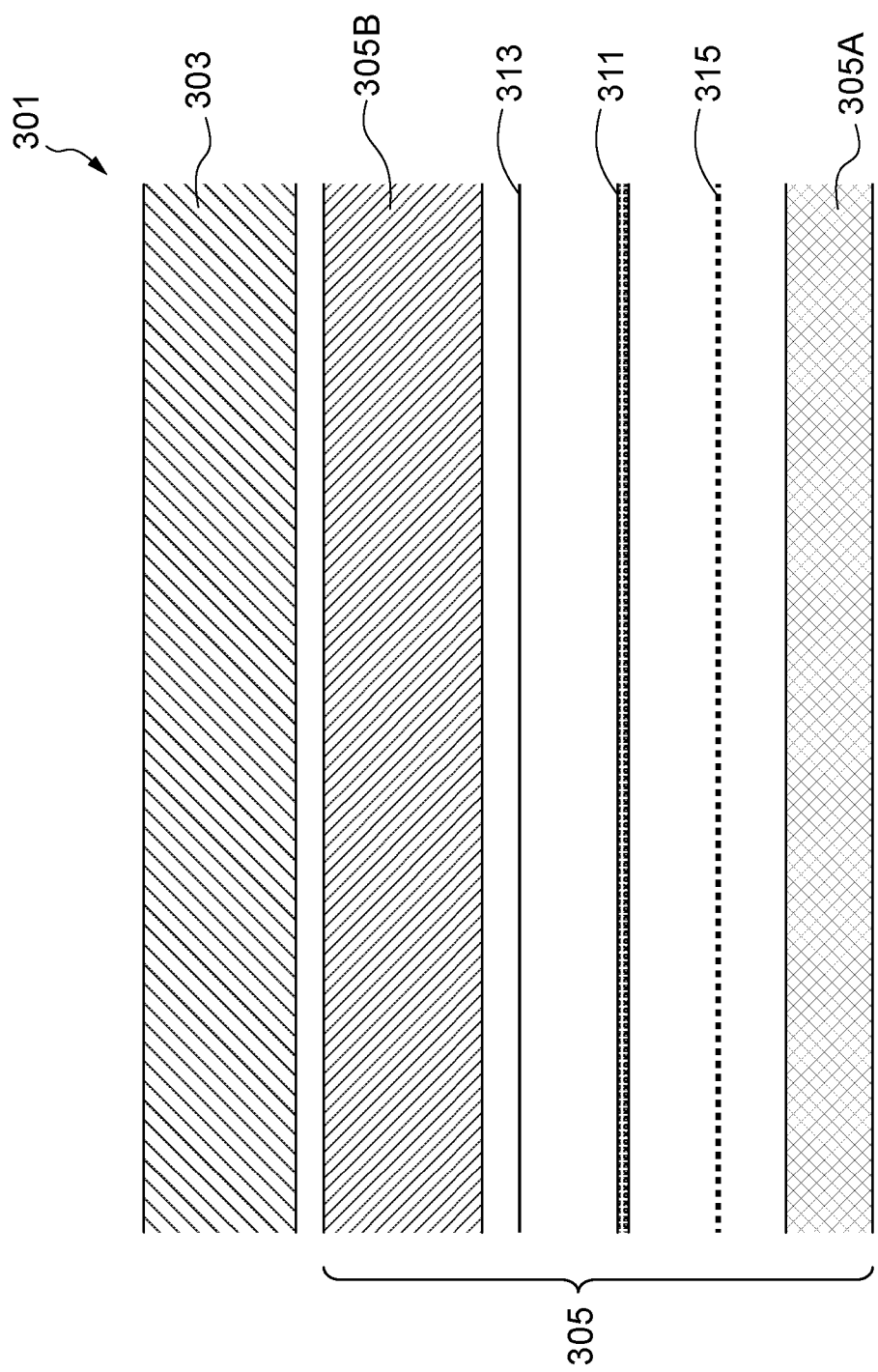
FIG. 7 is an exploded view of the partial cross-section of the carbon steel host pipe shown in FIG. 5.

FIG. 5 shows a cross-section through a lined pipe 301 which comprises a carbon steel host pipe 303 and a liner 305, now in accordance with the present invention. As above, the carbon steel host pipe 303 is provided with corrosion resistance by installation of the liner 305 (using a reduction and reversion process) which remains in tight contact with the interior surface of the carbon steel host pipe 303. However, the liner 305 differs from the liner 205 illustrated in FIG. 2 in at least one key detail. Note that FIG. 7 is an exploded view of the cross-section through the lined pipe 301 shown in FIG. 5, for ease of reference.

Similar to FIG. 2, the liner 305 comprises an outer polymer layer, polymer pipe 305B, which is bonded to barrier layer 311 using an adhesive 313. It is the outer polymer pipe 305B which contacts the host pipe 303 after the liner 305 has reverted. It will be understood that the outer polymer pipe is substantially cylindrical, hence describing same as a "pipe". As noted elsewhere it might equivalently be termed an outermost polymer layer.

However, inner polymer layer pipe 205A has been replaced with a porous pipe 305A which is bonded to the barrier layer 311, on the opposite side of the barrier layer 311 from the outer polymer pipe 305B, using a (preferably porous) adhesive 315. It will again be understood that the porous pipe 305A is also substantially cylindrical, hence describing same as a "pipe". As noted elsewhere it might equivalently be termed an innermost polymer layer.

Figure 6:
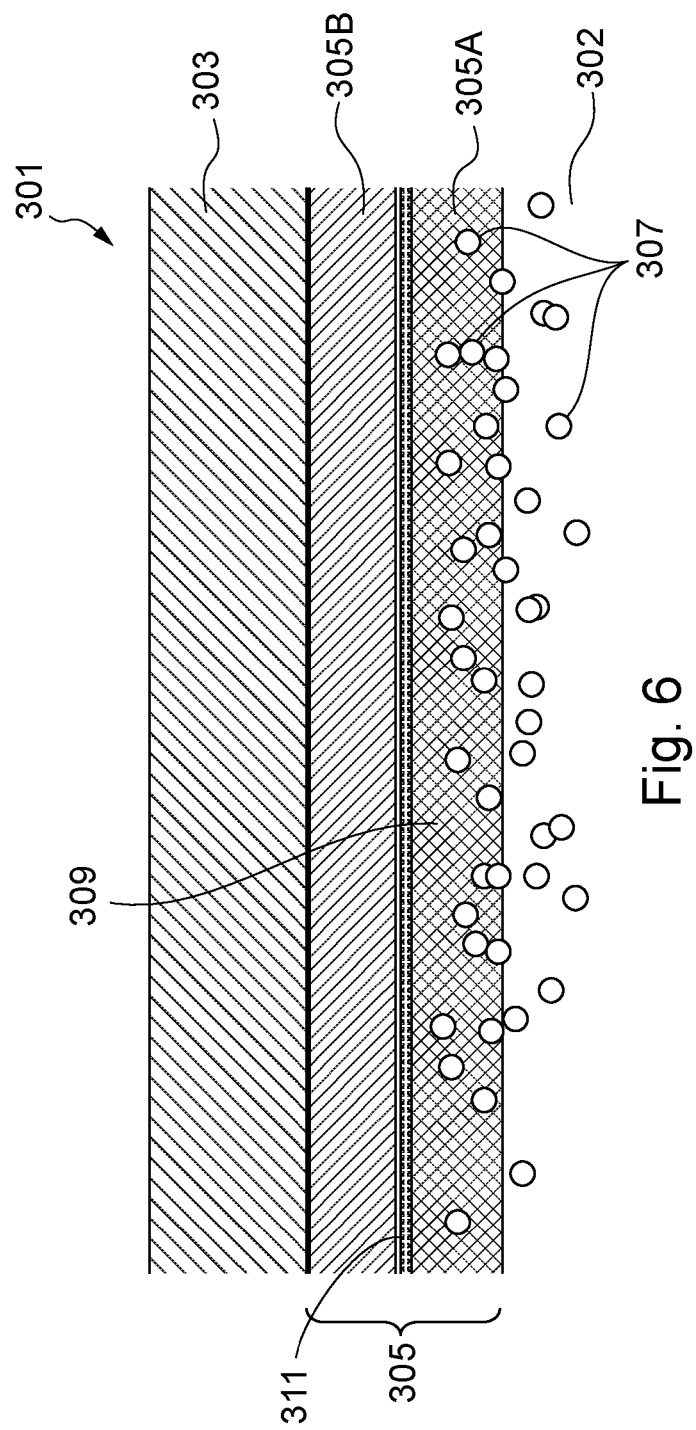
FIG. 6 illustrates a partial cross-section of the carbon steel host pipe shown in FIG. 5, in live hydrocarbon service.

To illustrate the significance of this change, FIG. 6 shows the lined pipe 301 being used in live hydrocarbon service. In contrast with the scenarios illustrated in FIG. 2 and FIG. 4, gas (as indicated by reference numeral 307) is allowed to pass freely between the internal bore 302 of the lined pipe 301 and the barrier layer 311 such that there is no accumulation of gas within the layers of the liner 305 that would otherwise pose a risk of collapse.

For the avoidance of doubt, the purpose of the porous pipe 305A is expressly to permit the passage of gas 307 (or liquid) through the inner layer (or layers) of the liner 305, between the internal bore 302 of the lined pipe 301 and the barrier layer 311 and vice versa. This is in contrast to the polymer liner 105 shown in FIGS. 1 and 2 and the inner polymer pipe 205A shown in FIGS. 3 and 4 which substantially prevent the passage of gas 107,207.

Passage of gas in those cases occurs by permeation through the polymer material, and because the passage of gas is substantially prevented, in both directions, this causes the gas to accumulate on the other side (if a small percentage of gas can permeate in one direction, only a small percentage of that gas can then permeate in the opposite direction). The porous pipe 305A comprises a polymer material and purposely has a plurality of pores or interstices which permit the passage of gas (or liquid), whereas the polymer liner 105 shown in FIGS. 1 and 2 and the inner polymer pipe 205A shown in FIGS. 3 and 4 is substantially solid (i.e. does not permit the passage of gas or liquid).

Note that examples of suitable materials and arrangements are discussed further below in the context of a (non-limiting) manufacturing process that may be used to manufacture a liner according to the invention.

In contrast with solutions to the problem of liner collapse as discussed in the Background to the Invention above, the invention does not assume that gas permeation is inevitable and simply seek to mitigate the resulting risk; rather, the invention prevents permeation and furthermore prevents the resulting risk being moved from an annulus between a liner and a host pipe to an interface between a barrier layer and an inner polymer pipe (of a barrier pipe). By preventing permeation in a way that does not compromise the integrity of the pipeline, corrosive attack on the carbon steel host pipe can be reliably prevented. Furthermore, there is no need to modify the external surface of the liner and/or provide additional components to vent permeated gas as required in the prior art.

A further benefit of the invention which follows is that the necessity for CRA materials will be significantly reduced because the carbon steel host pipe is no longer being exposed to corrosive products in service. This will result in a significant reduction in the total cost as well as in the environmental impact of such pipelines. Even if the barrier layer comprises a CRA material, this would still represent a significant reduction in CRA material overall because a CRA barrier layer would contain only a small fraction of the amount of CRA that would be used to line or clad the same length of pipe.

Although in the embodiments and examples above the host pipe is described as being a carbon steel host pipe, it will be understood that the material of the host pipe is incidental and may in fact comprise any material; in other words the liner of the invention may be used as a liner for any kind of pipe. What is important is the structure and/or features of the liner which address the problems of gas permeation through conventional liners.

Also, although in the embodiments and examples of the invention described above the inner (porous) and outer polymer pipes are illustrated and described as comprising a single layer, it is also foreseen that each layer could comprise multiple layers; in other words, one or both pipes could comprise a laminate or other arrangement of multiple layers.

Furthermore, although the preferred technique for installation of the liner is the reduction (via a swaging die), insertion and reversion technique developed by British Gas and subsequently refined for the oil and gas industry by Swagelining Limited, it will be appreciated that the invention is not limited to or by any particular method of inserting the liner. For example, it is known that instead of pulling a liner through a reduction die it may be pulled through one or more reduction rollers (sometimes termed "roll-down"). Such a technique is employed in the Tite Liner® system developed by United Pipeline Systems.

Alternatively, the liner may be folded or otherwise deformed into an H-, U- or C-shaped cross-section, inserted into the host pipe, and then allowed or caused to return to its original shape by application of heat and/or pressure for example. This is sometimes referred to as close-fit lining or fold and form lining. Further alternatively, the liner may be inserted using the so-called slip-lining technique, whereby the liner is selected to have a smaller outer diameter than the inner diameter of the host pipe, and after (or during) insertion the annular space between the liner and the host pipe is sealed or grouted.

FIG. 8 shows (in exploded view) a partial cross-section through a lined pipe 401 which comprises a flexible host pipe 403 and an alternative liner 405, in accordance with the present invention. In this embodiment, the liner 405 differs from the liner 305 illustrated in FIGS. 6 and 7 in that there is no outer polymer layer. Instead, it is the barrier layer 411 which contacts the host pipe 403. The Applicant realises that in some applications the benefits of the invention, which stem from the porous nature of the inner pipe, can be enjoyed without the need for an outer pipe and this embodiment reflects that realisation.

As before, the liner comprises an inner porous pipe 405A which is bonded to the barrier layer 411, on the opposite side of the barrier layer 411 from the host pipe 403, using a (preferably porous) adhesive 415. Examples of flexible host pipe in which such a liner 405 may be deployed include reinforced thermoplastic pipe and flexible pipes and risers such as may be used for hydrocarbon service. Again, gas is allowed to pass freely between the internal bore (not shown) of the lined pipe 401 and the barrier layer 411 such that there is no accumulation of gas within the layers of the liner 405 that would otherwise pose a risk of collapse, and gas is prevented from permeating to and accumulating in the annulus between the barrier layer and the flexible host pipe 403.

Method of Manufacture

There will now be described exemplary but non-limiting methods of manufacture of a liner according to the invention. It will be understood that other methods of manufacture are and will be possible, and the described method may be modified to suit the materials used and/or the service environment. The following description allows certain preferred and optional features of the liner to be understood in the context of the manner in which the liner is to be manufactured and/or the service environment for which it is intended, including selection of suitable materials.

Firstly, the innermost polymer pipe is extruded (in cylindrical form) from material which is accepted as suitable for being in contact with the transported products.

Typically, the material could comprise commodity polymer grade porous or sintered porous materials such as polyethylene (PE), PE-RT, UHMWPE or be selected from the PP range of polymer grades. For more onerous performance applications, higher grade engineering polymers such as PVDF or PTFE may be used in porous form. When appropriate and in response to the service environment, materials may be hydrophobic or hydrophilic in nature. Pore size, pore density and wall thickness of the porous innermost pipe will be determined in response to the demands of the application, i.e. the service environment for which it is intended.

It is anticipated that the innermost polymer pipe could comprise a composite of different materials as may be appropriate, and it is also anticipated that the innermost polymer pipe could comprise multiple layers of different (or the same) materials. In this way different properties of different materials can be exploited. For example, one layer might provide hydrophobic or hydrophilic properties and another sub-layer might provide mechanical strength. Each layer may be extruded in turn. A porous adhesive may be applied between the layers to join them together while preserve the porosity of the layer as a whole.

The thickness of the innermost polymer pipe can be calculated or otherwise determined (for example from a look up table) at the pipe design stage and will depend upon the properties of the selected materials. For example, a material with high modulus enables the innermost polymer pipe to be thinner than is possible with a lower modulus material.

After extrusion, the innermost polymer pipe may be allowed to cool sufficiently prior to attaching the metallic foil which will form the barrier layer. The metallic foil may comprise aluminium, stainless steel or any corrosion resistant alloy such as Monel, Incoloy, Inconel or titanium or other such metallic material that is appropriate for the service environment. Wall thickness of the metallic foil may vary depending upon the service environment and the material properties but manufacturing tolerances are such that foils are available in thickness ranges from 0.009 mm and above.

The metallic foil is generally attached to the innermost polymer pipe by an adhesive. The adhesive may be solid but is preferably porous and may be heat sensitive. Conveniently, the adhesive may take the form of an adhesive tape. The adhesive may be applied directly to the external surface of the innermost pipe immediately before applying the metallic layer. For example, if the adhesive takes the form of an adhesive tape, the adhesive tape can be wound around the innermost pipe. Alternatively, the adhesive layer may be pre-applied to the inner surface of the metallic layer in preparation for application to the external surface of the innermost polymer pipe.

The metallic foil may be applied to the innermost polymer pipe by a continuous axial operation (i.e. in discrete circumferential sections) or by spirally winding the metallic foil around the innermost polymer pipe. In either application, the metallic layer will overlap to ensure there is no gap in the protective layer provided by the metallic foil. It is important that there is no pathway for the transit of permeated gas from the transported fluid to reach the carbon steel host pipe.

Application bonding (or sealing) of the metallic foil may be facilitated by either the use of the adhesive only where the overlap is heat sealed or by an option based on welding of the overlapping edges of the metallic foil or by an option of welding in combination with adhesive. The foil may be welded using—for example—very low amperage (low heat) Gas Thermal Arc Welding (GTAVV) or by ultrasonic welding. Typically, these methods produce a fusion bond through very low heat generative processes.

In whatever welding method is applied, the fusion of the metallic foil overlap seam should not present a risk of damage to the innermost polymer pipe as a result of heat originating from the welding process. It should be noted that when the process selected is based on a combination of low temperature welding together with pre-applied adhesive, the area adjacent to the weld area on both sides of the metallic foil may be kept free of adhesive to avoid contamination of the fusion joint. When no welding operation is to be used, then the pre-applied adhesive may cover the full area of the metallic foil on both sides and may be heat sealed during the foil wrapping operation.

As noted above, it is foreseen that the liner need not necessarily be provided with a second or outermost polymer pipe, and that a liner suitable for certain (if not all) applications can be substantially comprised of only the innermost polymer pipe and a barrier layer surrounding the innermost polymer pipe. However, there are now described additional steps which may be carried out to provide such an outermost polymer pipe if desired or required by operational considerations. Note that this method can also be used to produce a composite pipe; i.e. a pipe in which the outermost polymer pipe effectively constitutes the host pipe.

The outermost polymer pipe can be formed by extrusion coating of the selected polymer material over the metallic foil layer using an annular die. A vacuum applied under the annular extruded melt can be employed to draw the outermost pipe onto the outer layer of metallic foil and adhesive and thereby ensure it fits tightly. Thereafter, the fully formed liner may be cooled to a completed condition and may be cut to length. The material of the outermost polymer pipe may comprise one or more solid materials selected from the group comprising PE, PE-RT, UHMWPE, PP, PVDF and PTFE.

As it may be difficult to butt fuse the multi-layered liner described herein, multilayer liner stalks may be manufactured in accordance with the guidance set out above to pre-set lengths to suit the length of the carbon steel stalks being lined. There are polymer pipe manufacturers in various parts of the world who extrude polymer pipe directly into the sea, so it is known to be possible to extrude extremely long lengths of polymer pipe. In these facilities, such long lengths are then towed by sea to the final destination. Alternatively, a modular extrusion facility may be employed to allow multi-layer liner to be manufactured on the pipeline site, which may be a spoolbase, a bundle site or a double/quad/hex jointing facility. It is foreseen that a liner may be extruded directly on to a suitable reel (or reels) for onward shipment to its destination.

Method of Lining a Pipe

As discussed above, it is preferred that the liner be inserted in a host pipe using a reduction and reversion process, such as Swagelining® or roll-down. It will also be understood that other methods of lining a pipe with such a liner are possible (as intimated above with examples). The following short description of the preferred process allows certain preferred and optional features of the liner to be understood in the context of the manner in which the liner is to be installed. Note that these methods are applicable whether the liner comprises an outer or second polymer pipe or not.

Prior to insertion in a host pipe, the external diameter of the (multi-layer) liner is greater than the internal diameter of the host pipe. The liner is temporarily reduced in diameter, for example by pulling it through a swaging die or reduction rollers, such that the external diameter of the liner is less than the internal diameter of the host pipe. The liner is then inserted into the host pipe, for example by maintaining tension and continuing to pull the liner through the host pipe. Once the liner has been inserted into the host pipe, it is allowed to revert towards its original size, for example by release of the pulling tension. The liner thus forms a tight fit within the host pipe.

Note that where there is provided an outermost polymer pipe the external diameter of the outermost polymer pipe (or outer polymer layer) is greater than the internal diameter of the host pipe. It is optional in this case whether the external diameter of the inner polymer pipe is greater than the internal diameter of the host pipe. Where there is no outermost polymer pipe provided the external diameter of the inner polymer pipe may be greater than the internal diameter of the host pipe, or may be less than the internal diameter of the host pipe so as to permit slip-lining.

The invention provides an improved pipe liner and associated methods, including a method of manufacturing the improved pipe liner and a method of lining a host pipe with such a pipe liner. The invention solves the problem of gas permeation through a polymer liner in hydrocarbon service which can result in corrosion of the host pipe and can also cause liner collapse. Corrosion occurs due to contact between corrosive species and the host pipe itself. Gases can also accumulate in an annulus between or within the liner and the host pipe and expand during operational de-pressurisation of the pipeline, causing collapse of the liner. The improved pipe liner comprises a barrier layer, which prevents permeation through the liner, surrounding an inner polymer pipe and optionally covered by an outer polymer pipe. The inner polymer pipe is porous which permits free movement of gas between the internal bore of a lined pipe and the barrier layer, so as to prevent accumulation of gases anywhere in the lined pipe, while ensuring that gases do not permeate to, and damage, the host pipe. The liner can be inserted using Swagelining, roll-down, or any other suitable close-fit lining techniques, without compromising the effectiveness of the barrier layer.

For the avoidance of doubt, and as mentioned above, the term "porous" is technically and functionally distinct from the term "permeable", and in any case it should be understood that standard polymer materials are generally considered to be impermeable, certainly within the specific range of temperatures and pressures in the environment at which they are normally targeted.

In a hydrocarbon environment, small amounts of gas or other corrosive species will eventually transit through a polymer liner over time, but this is a very gradual process that is the result of significant pressure differentials and temperature influences on the material. This gradual transit over time is known as permeation.

Gas that has transited through the material by permeation will eventually accumulate in the annulus in a polymer lined pipe. Accumulated gas is unable to easily or rapidly return to the pipe bore due the fact the only mechanism by which it may transit through the liner is by the same gradual process of permeation. When pressure in the bore is reduced, possibly suddenly, the accumulated gas cannot return through the material quickly enough and its expansion triggers a collapse of the liner.

To summarise, although permeation (eventually) occurs in hydrocarbon service, the material of such liners cannot be described as permeable; the liner material is intentionally selected to be substantially impermeable for the simple reason that permeation is totally undesirable.

Barrier pipe addresses the issue that it is inevitable that some gas or liquid will eventually permeate through the polymer liner, and does so by locating a metallic (e.g. aluminium) barrier layer within the liner. Gas or liquid which permeates through the innermost layer of the barrier pipe will be effectively halted at the metallic barrier layer.

As noted above, the Applicant has realised that because the liner material is substantially impermeable, gas that has transited through the inner layer by permeation will eventually accumulate at the barrier layer and will effectively be trapped there, shifting the risk of liner collapse from the annulus between the liner and the host pipe to the interface between the barrier pipe and the innermost layer of the barrier pipe.

To solve this problem, the Applicant's invention facilitates free transit of gas in all directions, with immediate effect, because the innermost layer of the liner is porous. There is no gradual transit phenomenon over time (i.e. no permeation) and therefore accumulation of the kind discussed above is not possible. The porous nature of the innermost layer thereby eliminates the risk of collapse.

As may be used herein, the terms bottom, lower, below and the like are descriptive of a feature that is located towards a first end/side of an apparatus, system or component while the terms top, upper, above and the like are descriptive of a feature that is located towards a second, opposing end/side of the apparatus, system or component. Such an apparatus, system or component may be inverted without altering the scope of protection which, as below, is defined by the appended claims.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims. For example, and for the avoidance of doubt, the second or outer polymer pipe is optional but preferred in some applications, and the invention may also be realised in a composite pipe which comprises a barrier layer sandwiched between a flexible outer pipe and a porous inner pipe.

The invention claimed is:

1. A liner for lining a host pipe, the liner comprising:
an inner polymer pipe; and
a barrier layer surrounding the inner polymer pipe;
wherein the inner polymer pipe is porous, having a plurality of pores or interstices which permit the passage of gas, such that the inner polymer pipe permits free movement of gas between the internal bore and the barrier layer, preventing accumulation of gases within the layers of the liner;
wherein the inner polymer pipe is bonded to the barrier layer using an adhesive;
wherein the liner further comprises an outer polymer pipe surrounding the barrier layer; and
wherein the outer polymer pipe is non-porous.

2. The liner of claim 1, wherein the inner polymer pipe comprises one or more materials selected from the group comprising PE, PE-RT, UHMWPE, PP, PVDF and PTFE.

3. The liner of claim 1, wherein the inner polymer pipe comprises a hydrophobic or hydrophilic material.

4. The liner of claim 1, wherein the inner polymer pipe comprises two or more layers joined by a porous adhesive.

5. The liner of claim 1, wherein the barrier layer comprises a metallic foil.

6. The liner of claim 5, wherein the metallic foil comprises one or more materials selected from the group comprising aluminium, stainless steel, Monel, Incoloy, Inconel or titanium.

7. The liner of claim 1, wherein the barrier layer is attached to the inner polymer pipe by a porous adhesive.

8. The liner of claim 1, wherein the barrier layer is attached to the inner polymer pipe by an adhesive tape which is temperature and/or pressure sensitive.

9. The liner of claim 1, wherein the barrier layer comprises a plurality of discrete, overlapping circumferential sections.

10. The liner of claim 1, wherein the barrier layer is wound around the inner polymer pipe, and wherein successive turns of the barrier layer overlap.

11. The liner of claim 10, wherein the barrier layer is sealed by welds at the overlaps.

12. The liner of claim 1, wherein the outer polymer pipe is extruded over the barrier layer.

13. The liner of claim 12, wherein the outer polymer pipe comprises one or more solid materials selected from the group comprising PE, PE-RT, UHMWPE, PP, PVDF and PTFE.

14. A method of manufacturing a liner, the method comprising:
extruding an inner polymer pipe;
surrounding the inner polymer pipe with a barrier layer; and
surrounding the barrier layer with an outer polymer pipe;
wherein the inner polymer pipe is porous, having a plurality of pores or interstices which permit the passage of gas, such that the inner polymer pipe permits free movement of gas between the internal bore and the barrier layer, preventing accumulation of gases within the layers of the liner;
wherein the inner polymer pipe is bonded to the barrier layer using an adhesive; and
wherein the outer polymer pipe is non-porous.

15. The method of claim 14, wherein the inner polymer pipe is extruded from one or more porous materials or one or more sintered materials.

16. The method of claim 14, wherein the inner polymer pipe comprises two or more layers, and the method comprises extruding the second and each subsequent layer over the preceding layer and providing a porous adhesive between the layers.

17. The method of any of claim 14, wherein the method comprises determining a pore size, pore density and/or wall thickness of the inner polymer pipe in response to the service environment for which the liner is intended, and/or dependent on the properties of the material of the inner polymer pipe.

18. The method of any of claim 14, wherein the method comprises selecting a material of the barrier layer in response to the service environment for which the liner is intended, and/or selecting a thickness of the barrier layer in response to the properties of the material and/or the service environment for which the liner is intended.

19. The method of any of claim 14, wherein the method comprises applying an adhesive or an adhesive tape to the external surface of the inner polymer pipe, or the internal surface of the barrier layer, then applying the barrier layer to the inner polymer pipe.

20. The method of any of claim 14, wherein the barrier layer is applied to the inner polymer pipe in a continuous axial operation.

21. The method of any of claim 14, wherein the barrier layer is spirally wound around the inner polymer pipe, and wherein successive turns of the barrier layer overlap.

22. The method of any of claim 14, wherein the method comprises sealing the barrier layer by heat sealing or by welding overlapping edges of the barrier layer.

23. The method of any of claim 14, further comprising extruding the outer polymer pipe over the barrier layer.

24. The method of any of claim 14, wherein the outer polymer pipe is extruded over the barrier layer by using an annular die and applying a vacuum to draw the outer polymer pipe onto the barrier layer.

25. The method of any of claim 14, wherein the method comprises manufacturing the liner to a pre-set length to suit a host pipe for which the liner is intended, or wherein the liner is extruded directly on to a reel or reels for onward shipment.

26. A method of lining a host pipe, the method comprising:
providing a liner according to any of claim 1;
temporarily reducing the outer diameter of the liner such that it is less than the internal diameter of the host pipe;
inserting the liner into the host pipe; and
allowing the liner to revert towards its original size within the host pipe.

27. A composite pipe comprising:
a first polymer pipe;
a barrier layer surrounding the first polymer pipe; and
a second polymer pipe surrounding the barrier layer;
wherein the first polymer pipe is porous, having a plurality of pores or interstices which permit the passage of gas, such that the first polymer pipe permits free movement of gas between an internal bore and the barrier layer, preventing accumulation of gases within the layers of the composite;

wherein the first polymer pipe is bonded to the barrier layer using an adhesive; and wherein the second polymer pipe is non-porous.

28. A method of manufacturing a composite pipe comprising:

extruding an first polymer pipe;

surrounding the first polymer pipe with a barrier layer; and extruding a second polymer pipe over the barrier layer;

wherein the first polymer pipe is porous, having a plurality of pores or interstices which permit the passage of gas, such that the first polymer pipe permits free movement of gas between an internal bore and the barrier layer, preventing accumulation of gases within the layers of the composite pipe;

wherein the first polymer pipe is bonded to the barrier layer using an adhesive; and wherein the second polymer pipe is non-porous.

\* \* \* \* \*